United States Patent
Gibble

(10) Patent No.: US 8,566,006 B2
(45) Date of Patent: Oct. 22, 2013

(54) METHOD FOR CONTROLLING COMBUSTION IN A MULTI-CYLINDER ENGINE, AND MULTI-CYLINDER ENGINE

(75) Inventor: John C. Gibble, Greencastle, PA (US)

(73) Assignee: Mack Trucks, Inc., Greensboro, NC (US)

( * ) Notice: Subject to any disclaimer, the term of this patent is extended or adjusted under 35 U.S.C. 154(b) by 590 days.

(21) Appl. No.: 12/863,781

(22) PCT Filed: Jan. 24, 2008

(86) PCT No.: PCT/US2008/051837
§ 371 (c)(1),
(2), (4) Date: Jul. 21, 2010

(87) PCT Pub. No.: WO2009/094026
PCT Pub. Date: Jul. 30, 2009

(65) Prior Publication Data
US 2010/0292910 A1    Nov. 18, 2010

(51) Int. Cl.
*F02D 43/00* (2006.01)
*F02D 41/00* (2006.01)

(52) U.S. Cl.
USPC .......................................... 701/103; 123/673

(58) Field of Classification Search
USPC .......... 701/103, 104, 105, 108; 123/673, 472, 123/478
See application file for complete search history.

(56) References Cited

U.S. PATENT DOCUMENTS

| | | |
|---|---|---|
| 4,561,397 A | 12/1985 | Tsukamoto et al. |
| 4,869,222 A | 9/1989 | Klassen |
| 5,117,790 A | 6/1992 | Clarke et al. |
| 5,441,027 A | 8/1995 | Buchanon et al. |
| 5,803,048 A | 9/1998 | Yano et al. |
| 5,904,129 A | 5/1999 | Kadota |
| 6,789,531 B1 | 9/2004 | Remmels |
| 6,901,920 B2 | 6/2005 | Dohta |
| 6,947,826 B2 | 9/2005 | Deibert et al. |
| 6,962,140 B1 | 11/2005 | Nakai et al. |
| 7,163,007 B2 | 1/2007 | Sasaki et al. |
| 7,231,906 B1 | 6/2007 | Haskara et al. |
| 2004/0200464 A1* | 10/2004 | Ikemoto ..................... 123/673 |
| 2006/0016440 A1* | 1/2006 | Labbe ......................... 123/673 |
| 2006/0254568 A1* | 11/2006 | Bornitz et al. ............. 123/676 |
| 2007/0074705 A1 | 4/2007 | Nakasaka et al. |
| 2007/0137177 A1 | 6/2007 | Kittelson |
| 2007/0175443 A1* | 8/2007 | Schueler ..................... 123/402 |
| 2009/0020102 A1* | 1/2009 | Fattic .......................... 123/472 |

FOREIGN PATENT DOCUMENTS

| | | |
|---|---|---|
| DE | 19700711 A1 | 9/1998 |
| DE | 19944710 A1 | 5/2000 |
| DE | 102005018221 A1 | 10/2006 |
| EP | 1398483 A2 | 3/2004 |

(Continued)

OTHER PUBLICATIONS

International Search Report for corresponding International Application PCT/US2008/051837.

(Continued)

*Primary Examiner* — Mahmoud Gimie
(74) *Attorney, Agent, or Firm* — WRB-IP LLP

(57) ABSTRACT

A method for controlling combustion in a multi-cylinder engine includes injecting fuel into at least one cylinder of the multi-cylinder engine and, for each cylinder, separately controlling at least one fuel injection parameter to produce a desired exhaust composition for that cylinder. A multi-cylinder engine is also disclosed.

23 Claims, 2 Drawing Sheets

(56) References Cited

FOREIGN PATENT DOCUMENTS

| | | |
|---|---|---|
| EP | 1403490 A1 | 3/2004 |
| JP | 2000161145 A | 6/2000 |
| JP | 2003227381 A | 8/2003 |
| JP | 2007321616 A | 12/2007 |
| WO | 0190557 A1 | 11/2001 |
| WO | 2004055344 A1 | 7/2004 |
| WO | 2007008196 A1 | 1/2007 |

OTHER PUBLICATIONS

Supplementary European Search Report for corresponding European Application EP 08 71 3942.

English translation of Office Action to corresponding Japan application 2010-544283.

European Search Report (Jul. 12, 2012) for corresponding European Application No. EP 12 00 0594.

* cited by examiner

METHOD FOR CONTROLLING COMBUSTION IN A MULTI-CYLINDER ENGINE, AND MULTI-CYLINDER ENGINE

BACKGROUND AND SUMMARY

The present invention relates, generally, to a method for controlling combustion in a multi-cylinder engine, and a multi-cylinder engine, and, more particularly, a method for controlling combustion by controlling one or more fuel injection parameters and an engine in which combustion is controlled by controlling one or more fuel injection parameters.

Continued reductions in engine and system-out NOx emissions for heavy duty diesel engines have led to increasing use of exhaust gas recirculation. Upon analyzing cylinder to cylinder charge mass concentrations in certain engines it has been discovered that non-homogeneous EGR and fresh air mixing often occurs. This unbalanced mixing may be harmful to engine components and detrimental to engine performance and emissions.

If EGR concentrations are very high in certain cylinders due to improper mixing, increasing particulate matter (e.g., smoke) and hydrocarbons will be generated during combustion in the EGR-rich cylinder. High amounts of improperly burned carbon may damage a variety of engine components. If the gas is re-circulated from these cylinders into an EGR circuit, the EGR components including but not limited to valves and coolers will be exposed to damaging and fouling effects of such a mixture. Alternatively, if this gas with high levels of particulate matter and hydrocarbons is directed to an after-treatment system, it may over-load or damage the components. Cylinders that are low in EGR concentration will result in higher NOx concentrations and higher combustions temperatures. If the gas output of such a cylinder is directed to the tailpipe and not the EGR circuit, the measured tailpipe emissions may be higher than the actual average of cylinder out emissions.

Most solutions to the problem of unbalanced mixing involve experimentation supported with fluid dynamic modeling to optimize mixing chamber and manifold geometry to achieve more uniform mixing. However, a variety of factors such as component cost and packaging issues may result in a final hardware package that is not optimal for engine performance and emissions. Also, even engines with air handling system that are optimized for particular conditions are typically operated over a broad speed and load range. Flow dynamics may change outside of the designed-for conditions such that the design may be detrimental in mixing in other operating conditions. Some methods exist for reducing cylinder to cylinder power output variance by trimming fueling angles, but no known methods exist for addressing the aforementioned combustion and emissions concerns.

It is desirable to provide a multi-cylinder engine that achieves desired emissions compositions from all cylinders. It is also desirable to provide a method for achieving desired emissions compositions from all cylinders of a multi-cylinder engine.

According to an aspect of the present invention, a method for controlling combustion in a multi-cylinder engine comprises injecting fuel into at least one cylinder of the multi-cylinder engine and, for each cylinder, separately controlling at least one fuel injection parameter to produce a desired exhaust composition for that cylinder.

According to another aspect of the present invention, a multi-cylinder engine comprises a plurality of cylinders, a fuel injector associated with each cylinder of the plurality of cylinders, and a controller arranged to separately control at least one fuel injection parameter for each cylinder to produce a desired exhaust composition for that cylinder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
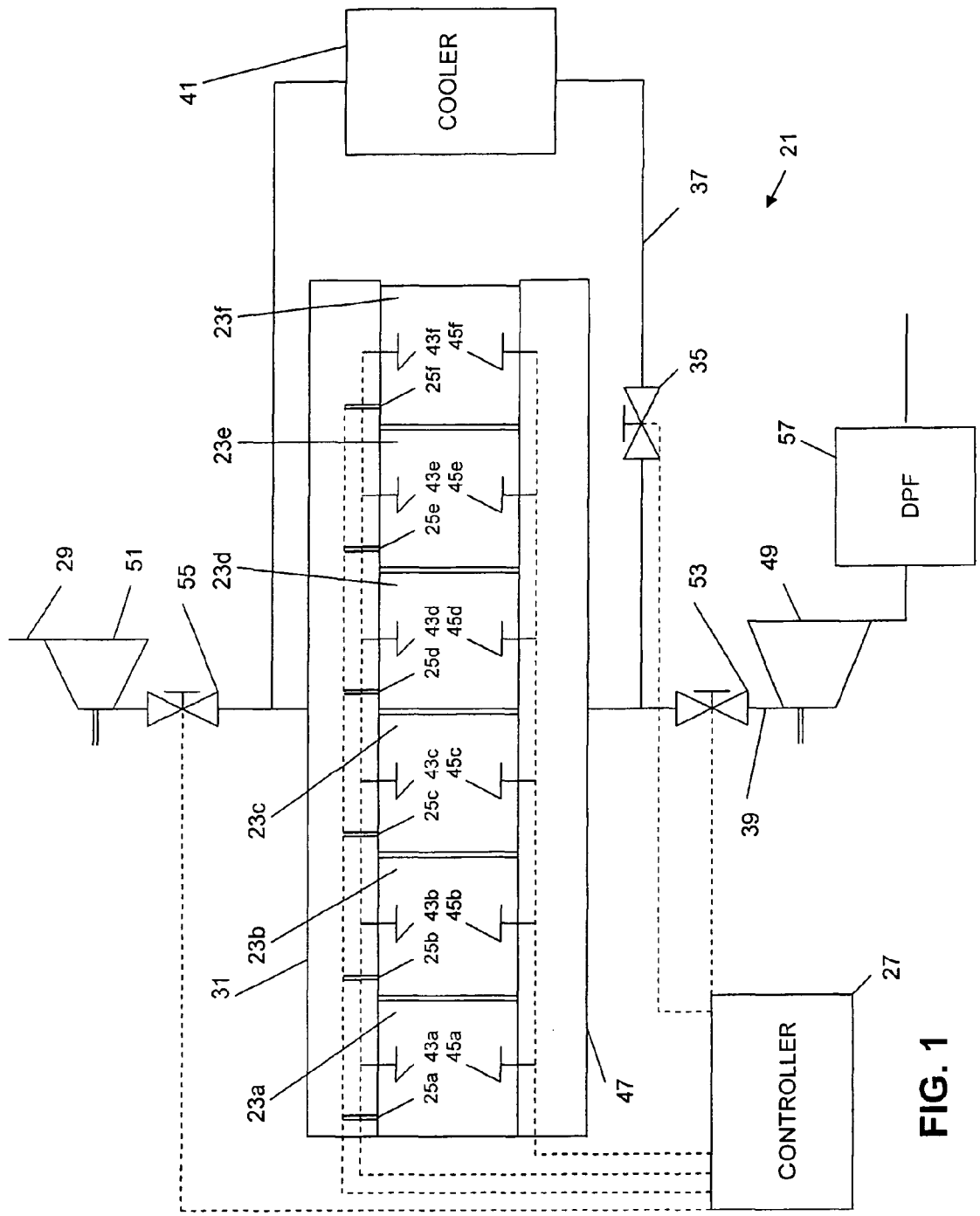
FIG. 1 is a schematic view of a multi-cylinder engine according to an aspect of the present invention.

A multi-cylinder engine 21 according to an aspect of the present invention is shown in FIG. 1 and comprises a plurality of cylinders 23a, 23b, 23c, 23d, 23e, and 23f. A fuel injector 25a, 25b, 25c, 25d, 25e, and 25f is associated with each cylinder 23a, 23b, 23c, 23d, 23e, and 23f, respectively, of the plurality of cylinders. A controller 27, such as a computer or ECU, is arranged to separately control at least one fuel injection parameter for each cylinder to produce a desired exhaust composition for that cylinder.

An intake air line 29 can be provided for introducing intake air into at least one, ordinarily all, of the cylinders. The intake air line 29 will ordinarily comprise a manifold 31 connecting each cylinder to the intake air line. A compressor 51 of a turbocharger is typically arranged upstream of the manifold 31.

An EGR system can be provided for introducing exhaust gas into at least one, ordinarily all, of the cylinders. The EGR system will typically comprise an EGR valve 35 in an EGR line 37 connecting an exhaust line 39 to the intake air line 29 or intake manifold 31. By opening and closing the EGR valve 35, more or less exhaust gas can be recirculated as desired. The controller 27 typically controls the EGR valve 35, often to obtain a desired balance between parameters such as fuel consumption, exhaust emissions, and exhaust temperature. The EGR system 33 will typically also comprise an EGR cooler 41 for cooling the exhaust gas that is recirculated to the at least one cylinder.

Each cylinder 23a, 23b, 23c, 23d, 23e, and 23f has one or more intake valves 43a, 43b, 43c, 43d, 43e, and 43f, respectively, and one or more exhaust valves 45a, 45b, 45c, 45d, 45e, and 45f. The controller 27 can be arranged to separately adjust timing for at least one or both of the intake valves and the exhaust valves for each cylinder 23a, 23b, 23c, 23d, 23e, and 23f. Adjusting timing of the intake and exhaust valves can affect the composition of the exhaust from each cylinder 23a, 23b, 23c, 23d, 23e, and 23f, as well as engine performance.

Each cylinder can be directly connected, via its intake valve, to the intake line 29 or intake manifold 31, and, via its exhaust valve, to the exhaust line 39 or exhaust manifold 47. The EGR line 37 will ordinarily connect to the exhaust line 39 downstream of the exhaust manifold 47 and upstream of a turbine 49 of a turbocharger including a compressor 51 in the intake line 29 and an exhaust valve 53 in the exhaust line. The EGR line 37 will ordinarily connect to the intake line 29 upstream of the intake manifold 31 and downstream of the compressor 51 and an intake valve 55 (if provided) in the intake line. Exhaust aftertreatment equipment such as a diesel particulate filter (DPF) 57 can be provided downstream of the turbine 49 in the exhaust line 39.

Figure 2:
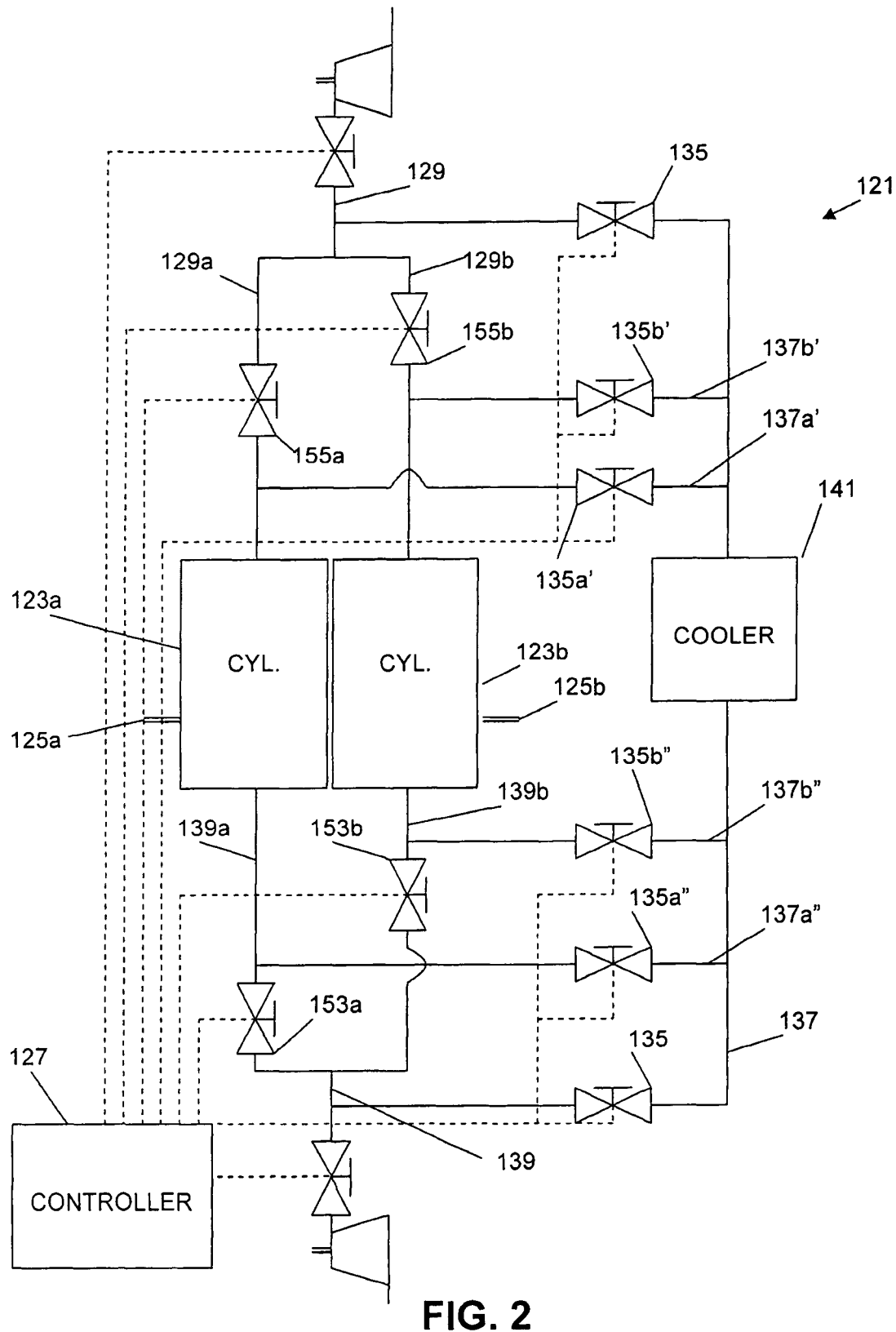
FIG. 2 is a schematic view of a multi-cylinder engine according to another aspect of the present invention.

An illustrative alternative arrangement for an engine 121 is shown in FIG. 2, showing only two cylinders 123a and 123b, each with fuel injectors 125a and 125b, respectively, for purposes of illustration. In the arrangement of FIG. 2, the composition of the intake gas and the exhaust gas can be handled separately for each cylinder 123a and 123b. For example, each cylinder 123a and 123b can be connected to the intake line 129 by a separate intake line 129a and 129b and connected to the exhaust line 139 by separate exhaust lines 139a and 139b. Each intake line 129a and 129b can be in flow communication with the EGR line 137 through separate portions 137a' and 137b' of the EGR line and, on an opposite side of an EGR cooler 141 in the EGR line, each exhaust line 139a and 139b can be in flow communication with the EGR line through separate portions 137a" and 137b" of the EGR line.

While valves in the intake, exhaust, and EGR lines can be opened mechanically, e.g., in the conventional manner of opening by a camshaft, they can be selectively opened and closed by a controller 127 to obtain desired intake, exhaust, and/or EGR gas compositions. By selectively opening and closing the valves, exhaust from at least one cylinder 123a can be directed to a different location than exhaust from the other cylinder 123b. For example, by opening exhaust valve 153a in exhaust line 139a, closing exhaust EGR valve 135a" in the portion 137a" of the EGR line, closing exhaust valve 153b in exhaust line 139b, and opening exhaust EGR valve 135b" in the portion 137b" of the EGR line, the exhaust from cylinder 123a can be caused to flow to the exhaust line 139 while the exhaust from cylinder 123b can be caused to flow to the EGR line. Valves 135a' and 135b' can be provided in the portions 137a' and 137b' of the EGR line 137 communicating with the intake lines 129a and 129b and can be controlled by the controller 127 to provide further control of the composition of the gas entering each cylinder 123a and 123b. Similarly, intake valves 155a and 155b in the intake lines 129a and 129b can also be controlled to provide further control of the composition of the intake gas in each cylinder 123a and 123b. Of course, the valves can also be controlled so that only part of an exhaust stream flows to the EGR line 135 (or some other location) and the rest flows to the exhaust line 139 (or some other location). An intake valve 143 in the intake line 129, an exhaust valve 145 in the exhaust line 139, and an EGR valve 135 in the EGR line 137 can also be provided for operation in a more conventional manner. It will be appreciated that other arrangements can be provided, such as arrangements that would permit the exhaust of particular cylinders to be recirculated to the intake of the same or other particular cylinders.

The fuel injectors used in connection with aspects of the present invention will ordinarily be any suitable type of controllable fuel injector that can be controlled to adjust fuel injection parameters such as timing of fuel injection, quantity of fuel injection, and pressure.

Except where otherwise noted, a method for controlling combustion in a multi-cylinder engine according to an aspect of the present invention shall be described in connection with the engine 21 of FIG. 1 for purposes of illustration. Except where otherwise noted, the description will apply to other embodiments, such as that shown in FIG. 2.

According to an aspect of the method, fuel is injected into at least one cylinder 23a, 23b, 23c, 23d, 23e, and/or 23f of the multi-cylinder engine 21. For each cylinder, at least one fuel injection parameter is separately controlled by the controller 27 to produce a desired exhaust composition for that cylinder. Fuel injection parameters that can be controlled for each cylinder by the controller 27 include one or more of fuel injection timing, fuel injection quantity, and/or fuel injection pressure. Pressure may also be controlled outside the injector, via means of a rail and regulator system.

Fuel pressure and timing can be controlled, as can the number of injections a particular cylinder undergoes in a cycle. There may, for example, be a multiple pilot injections, multiple main injections, and/or multiple post injections for a given cylinder event. Using multiple injections can allow for more complete control of the combustion pressures and temperatures, as well as emissions constituents. Pilot injections may occur close enough to the main event to result in a "boot" shaped injection, where there is not a complete end of combustion from the pilot injection before fuel is introduced in the next injection event—resulting in a rate-shaped event of continuous burn. Post injections may be used to introduce hydrocarbons into the exhaust to aid in aftertreatment control, when carbon rich environments are necessary for catalytic reaction or for burning.

The cylinders 23a, 23b, 23c, 23d, 23e, and 23f will each have an intake gas introduced through the intake valve 43a, 43b, 43c, 43d, 43e, and 43f, respectively, associated with each cylinder. The intake gas will ordinarily be some mixture of fresh intake air from the intake line 29 and EGR gas from the EGR line 37, and can comprise between 0-100% fresh air and 0-100% EGR gas. While the ratio of fresh air to EGR gas in a particular cylinder can be controlled by controlling flow of fresh air and EGR gas to the particular cylinder, such as by controlling opening and closing of various ones of the valves in the engine shown in FIG. 2, in more conventional systems, such as that shown in FIG. 1, the ratio of fresh air to EGR gas in a given cylinder may depend upon variables such as the amount of EGR flow, atmospheric pressure and temperature, engine load and speed, and the degree of mixing of fresh air and EGR gas that occurs before the intake gas enters the cylinders.

The at least one fuel injection parameter can be controlled as a function of the intake gas composition, e.g., fresh air to EGR gas ratio, in each cylinder to control combustion and, more particularly, to control combustion so that the desired exhaust composition for each cylinder 23a, 23b, 23c, 23d, 23e, and 23f is produced. Table 1, below, illustrates the typical effect of varying any one of the parameters timing, quantity, and pressure. It will be appreciated that the Table is intended to describe typical effects, and not the effects under all operating conditions.

TABLE 1

| Parameter | Action | NOx | Particulate Matter/ Hydrocarbon | Cylinder Pressure | Fuel Economy | Power |
| --- | --- | --- | --- | --- | --- | --- |
| Timing | Increase | Increase | Decrease | Increase | Increase | Increase |
| Quantity | Increase | Increase | Increase (typically) | Increase | N/A | Increase |
| Pressure | Increase | Increase | Decrease | Increase | Increase | Increase |

Typically, of the three parameters shown in Table 1, changes in timing of fuel injection tend to have the greatest effect on exhaust emissions for a cylinder, while changes in quantity typically tend to have the smallest effect on exhaust emissions.

By "increasing" timing, i.e., advancing fuel injection relative to a rotational position of a crankshaft corresponding to a top dead center position a piston connected to the crankshaft and reciprocating in the cylinder, the typical effect is that the fuel will mix better with the intake gas and more complete combustion will occur—and the fuel will have a longer time duration available for combustion, aiding in a more complete burn. Advanced timing normally leads to increased temperatures and pressures in the cylinder. This will ordinarily result in increased NOx levels, while tending to decrease particulate matter and hydrocarbon emissions. Ordinarily, cylinder pressure, fuel economy, and power will increase when fuel injection timing is advanced. Beyond some point, however, advancing timing no longer increases, and may decrease, NOx, cylinder pressure, fuel economy, and/or power, and/or no longer decreases particulate matter or hydrocarbon emissions, and may increase them.

As with increasing timing, increasing fuel injection pressure can, at least up to some point, result in superior mixing of the fuel with the intake gas, ordinarily resulting in more complete combustion and, thus, more NOx, less particulate matter and hydrocarbon emissions, and greater cylinder pressure, fuel economy, and power.

The effect of changes in fuel quantity in a given cylinder are less certain, particularly with respect to overall emissions and performance. It is presently anticipated that changes in fuel quantity will be adjusted for particular cylinders to achieve desired exhaust emissions for those cylinders only when, for whatever reason, desired emission levels cannot be achieved by adjusting injection timing or injection pressure, or when hardware limitations force a reduction in fuel quantity.

In an aspect of the invention seen in FIG. 2, exhaust from at least one cylinder 123a can be directed to a different location, such as the exhaust line 139, than exhaust from another cylinder 123b, such as by directing the exhaust entirely or partially to the EGR line 137. The exhaust from the cylinder 123b can then be introduced to at least one cylinder, such as by introducing it to one or both of cylinders 123a and 123b. While exhaust from the cylinder 123b is directed entirely or partially to the EGR line 137, exhaust from the cylinder 123a can be directed to the exhaust line 139 and then to an exhaust after-treatment system, which may include components such as a DPF 57 (FIG. 1). Of course, all of the cylinders 123a and 123b can direct all or part of their flow to one or both of the EGR line 137 and the exhaust line 139 as desired to achieve a particular emission composition.

The at least one fuel injection parameter can be controlled in view of various conditions, parameters, and objectives. For example, the at least one fuel injection parameter can be controlled as a function of at least one engine operating condition, such as atmospheric pressure and temperature, engine load and speed.

The at least one fuel injection parameter can be controlled for at least two of the cylinders to reduce exhaust composition variability between the at least two cylinders.

Exhaust from at least two of the cylinders can be mixed and the at least one fuel injection parameter can be controlled for the at least two cylinders to achieve a desired exhaust composition of the exhaust mixture.

The ability to control emissions on a cylinder by cylinder basis is applicable to either reducing variability; or inversely a cylinder to cylinder variance may intentionally be added to the system to optimize the compositions of gasses that are being directed to specific flow paths of the engine. By controlling the fueling parameters of one or more cylinders relative to other cylinders, the combustion process can be controlled on a much finer scale. Combustion events can be controlled by altering fuel delivery parameters such as fuel injection timing and quantity and fuel pressure. These fuelling parameters may be used alone or in conjunction with alternate valve opening and closing events to fully optimize the combustion mix.

Controlling the fueling parameters of one or more cylinders relative to other cylinders allows optimized engine out emissions while reducing fuel consumption and increasing engine component durability. By reducing cylinder to cylinder variation an optimized engine is likely to have reduced fuel consumption due to the non-linear behavior of emissions and fuel consumption trade-off curves.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling combustion in a multi-cylinder engine, comprising:
   injecting fuel into at least one cylinder of the multi-cylinder engine;
   for each cylinder, separately controlling at least one fuel injection parameter to produce a desired exhaust composition for that cylinder, and
   controlling the at least one fuel injection parameter as a function of at least one engine operating condition, the at least one engine operating condition comprising at least one of atmospheric pressure, atmospheric temperature, engine load, and engine speed.

2. The method for controlling combustion as set forth in claim 1, wherein the at least one fuel injection parameter includes fuel injection timing.

3. The method for controlling combustion as set forth in claim 1, wherein the at least one fuel injection parameter includes fuel injection quantity.

4. The method for controlling combustion as set forth in claim 1, wherein the at least one fuel injection parameter includes fuel injection pressure.

5. The method for controlling combustion as set forth in claim 1, comprising introducing intake air into at least one cylinder.

6. The method for controlling combustion set forth in claim 5, comprising introducing EGR gas into at least one cylinder.

7. The method for controlling combustion as set forth in claim 1, comprising introducing EGR gas into at least one cylinder.

8. The method for controlling combustion as set forth in claim 1, comprising directing exhaust from at least one cylinder to a different location than exhaust from another cylinder.

9. The method for controlling combustion as set forth in claim 8, comprising directing exhaust from at least one cylinder to an EGR system so that it is introduced to at least one cylinder.

10. The method for controlling combustion as set forth in claim 9, comprising directing exhaust from at least one cylinder to an exhaust after-treatment system.

11. The method for controlling combustion as set forth in claim 1, comprising directing exhaust front at least one cylinder to an exhaust after-treatment system.

12. The method for controlling combustion as set forth in claim 1, comprising controlling the at least one fuel injection parameter for at least two of the cylinders to reduce exhaust composition variability between the at least two cylinders.

13. The method for controlling combustion as set forth in claim 1, comprising mixing exhaust from at least two of the cylinders and controlling the at least one fuel injection parameter for the at least two cylinders to achieve a desired exhaust composition of the exhaust mixture.

14. The method for controlling combustion as set forth in claim 1, comprising, for each cylinder, separately adjusting timing for at least one of an intake valve and an exhaust valve for the cylinder.

15. The method for controlling combustion as set forth in claim 1, comprising controlling the at least one fuel injection parameter as a function of at least a ratio of EGR gas and fresh intake air introduced into the cylinder to produce the desired exhaust composition for that cylinder.

16. The method for controlling combustion as set forth in claim 1, comprising controlling the at least one fuel injection parameter so that, for at least one cylinder, the at least one fuel injection parameter is different than the at least one fuel injection parameter for another cylinder.

17. A multi-cylinder engine, comprising:
a plurality of cylinders;
a fuel injector associated with each cylinder of the plurality of cylinders; and
a controller arranged to separately control at least one fuel injection parameter for each cylinder to produce a desired exhaust composition for that cylinder as a function of at least one engine operating condition, the at least one engine operating condition comprising at least one of atmospheric pressure, atmospheric temperature, engine load, and engine speed.

18. The multi-cylinder engine as set forth in claim 17, comprising an intake air line for introducing intake air into at least one of the cylinders.

19. The multi-cylinder engine as set forth in claim 18, comprising an EGR system for introducing exhaust gas into at least one of the cylinders.

20. The multi-cylinder engine as set forth in claim 17, comprising an EGR system for introducing exhaust gas into at least one of the cylinders.

21. The multi-cylinder engine as set forth in claim 17, comprising an intake valve and an exhaust valve for each cylinder, the controller being arranged to separately adjust timing for at least one of the intake valve and the exhaust valve.

22. The multi-cylinder engine as set forth in claim 17, wherein the controller is arranged to control the at least one fuel injection parameter as a function of at least a ratio of EGR gas and fresh intake air introduced into the cylinder to produce the desired exhaust composition for that cylinder.

23. The multi-cylinder engine as set forth in claim 17, wherein the controller is arranged to control the at least one fuel injection parameter so that, for at least one cylinder, the at least one fuel injection parameter is different than the at least one fuel injection parameter for another cylinder.

* * * * *